July 2, 1940.  W. H. SWENARTON  2,206,063
MANUFACTURE OF NONREUSABLE BOTTLE SEAL
Filed Oct. 12, 1935  2 Sheets-Sheet 1
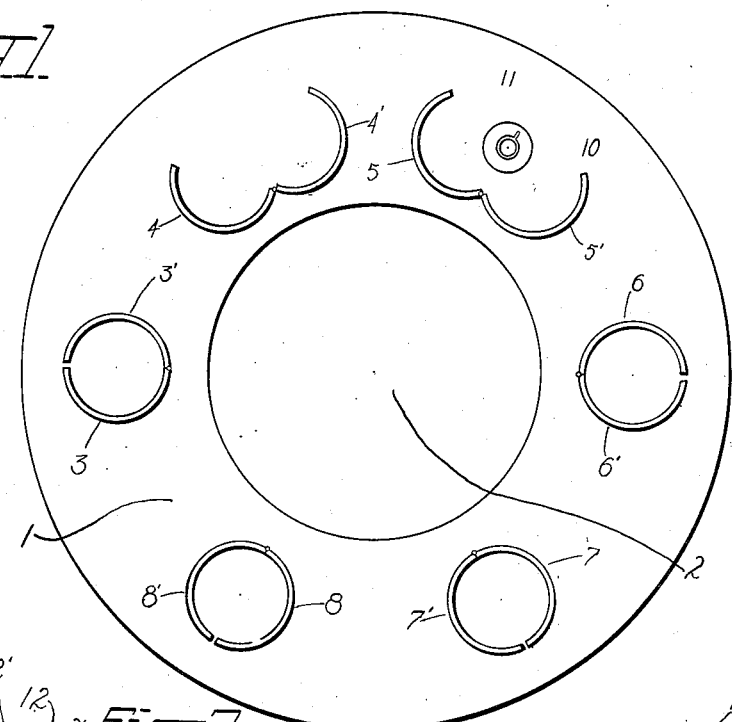
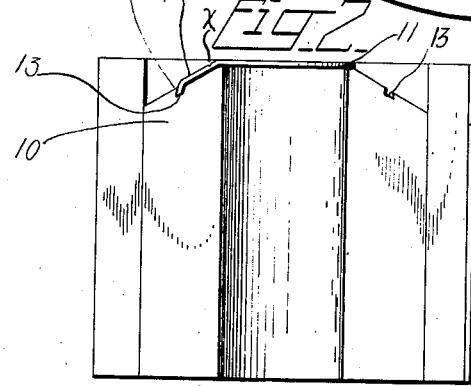
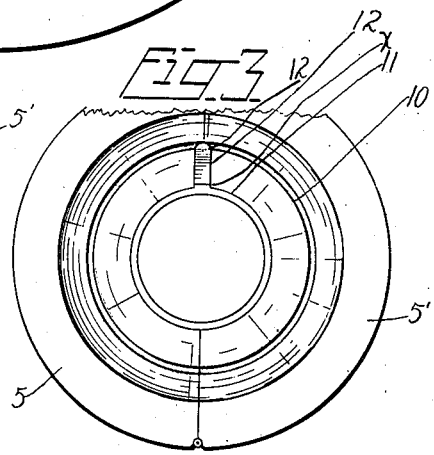
INVENTOR:
Waitstill H. Swenarton

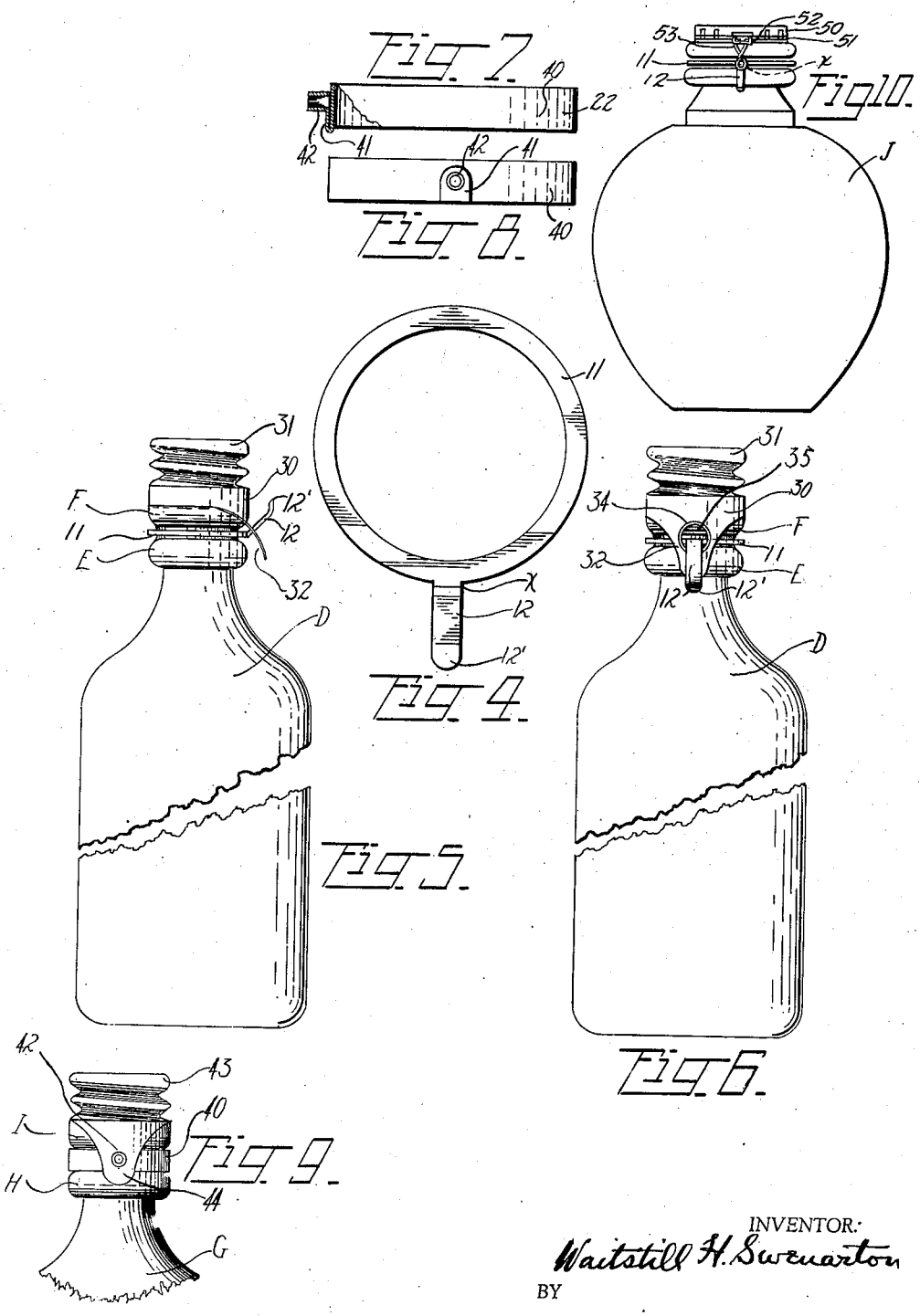

Patented July 2, 1940

2,206,063

UNITED STATES PATENT OFFICE 2,206,063

MANUFACTURE OF NONREUSABLE BOTTLE SEAL

Waitstill H. Swenarton, Montclair, N. J.

Application October 12, 1935, Serial No. 44,691

11 Claims. (Cl. 215—7)

This invention relates to the sealing of bottles so as to insure that the liquid or solid contents of the original package as introduced into the bottle by the manufacturer cannot, without detection, be surreptitiously tampered with or replaced by spurious or counterfeit ingredients prior to delivery to the ultimate consumer and has for its particular objects the provision of a simple, cheap and effective construction which lends itself to being applied to a bottle while being produced in a full automatic bottle making machine and which is adapted to prevent the removal of a cork or stopper from a bottle, once the contents have been permanently corked therein, except upon the visible mutilation of the seal but without necessitating any breakage of glass, with the consequence that the resealing of the bottle, after the same has been emptied or partially emptied of its original contents and refilled or adulterated, is positively precluded, since the seal cannot be restored to its original condition and the bottle resealed after the locking portion of the seal has once been mutilated to an extent sufficient to permit of the removal of the cork from the bottle.

I am aware that as set forth in Patent No. 944,166, it has been proposed to weaken the neck of a bottle and embed a wire loop in the glass with the ends thereof protruding which admitted, when the latter are twisted together, of the bottle neck being shorn off by such operation. Also, as disclosed in Patents Nos. 948,809 and 900,364, it has been proposed to seal a cork stopper within a glass bottle neck and to provide means for fracturing such neck to permit of the removal of any portion thereof and to thereby expose the cork in order to admit of the ready removal thereof. Again, as set forth in Patents Nos. 859,100 and 850,741, it has been proposed to provide a number of integral glass sealing lugs on the top end of the bottle neck which lugs were adapted to be projected through an applied bottle cap and thereafter fused to retain the cap in position or else to provide headed glass lugs on the opposite sides of the bottle neck to which a wire bail was secured.

The constructions disclosed in Patents Nos. 944,166, 900,364 and 948,809 are such that it is necessary to fracture the neck of the bottle in order to remove the contents, with the consequent ever present possibility of small particles of glass becoming admixed with such contents. The sealing means of the constructions, disclosed in the other two patents are, due to the fragile nature of the glass lugs or beads, likely to become broken in transit and also it is a simple matter after breaking off the lugs and removing the cap to simulate the original glass bead by cementing a substitute glass bead on the remaining stump.

Neither of the foregoing constructions possesses the advantages hereinafter described of my invention as set forth in the following detail description and drawings forming a part thereof, in which latter Figure 1 is a diagrammatic fragmentary plan view of the rotating table of an automatic bottle making machine of the O'Neill type and showing a neck mold positioned in one of the open blank molds with a sealing ring mounted therein;

Fig. 2 is a vertical elevation of half of the neck ring of such machine, showing the sealing ring in position therein;

Fig. 3 is a plan view of the closed neck ring showing such sealing ring mounted therein;

Fig. 4 is a plan view of a sealing ring, such as disclosed in Figs. 2 and 3, isolated;

Fig. 5 is a side elevation of a bottle equipped with a sealing ring, such as shown in Figs. 2 and 3, and showing the scored lug of such ring projecting through an aperture and tab of a bottle cap applied to the bottle, such scored lug being in an up-turned position;

Fig. 6 is a front elevation of the bottle shown in Fig. 5, but showing the scored lug in a depressed position;

Fig. 7 is a side elevation partly in section and Fig. 8 is a front elevation of a modified type of sealing ring having an integral rivet element projecting therefrom and which ring is struck-up from a single disc of sheet metal;

Fig. 9 is a fragmentary front elevation of a bottle showing the manner in which the sealing ring disclosed in Figs. 7 and 8 is employed to permanently lock a sealing cap to the bottle; and Fig. 10 is a fragmentary front elevation of a jug showing the application of my sealing means to a clamping-lever type of cap.

Referring to the drawings and the construction shown therein, the reference numeral 1 designates a rotating table or blank-mold-supporting means of an automatic bottle making machine of the O'Neill type wherein the blanks are formed in an inverted position, in other words, the neck ring is positioned at the bottom of the blank mold. The reference numeral 2 designates the central aperture of such support and 3, 3', 4, 4', 5, 5', 6, 6', 7, 7' and 8, 8' the respective hinged halves of the so-called blank molds of such machine. When such table or support has attained the position shown in Fig. 1, then the charge of molten glass is delivered into the closed mold which is in the position of the mold whose halves are designated 3, 3'.

The numeral 10 designates the neck ring which, as above stated, is positioned at the bottom of the mold and serves to form the terminal portion of the neck of the bottle and 11 designates a so-called sealing ring which, as hereinafter described, is applied to the neck of a bottle, during the manufacture of such bottle, below one of the annular ribs or what are commonly termed balls on the bottle neck. Such a ring is provided with an outwardly projecting, diametrically extending lug 12 which has an offset end 12' and which is scored, as indicated by the line $x$, preferably across that face thereof which constitutes the bottom face of the lug when the ring is applied to a bottle and the latter is in an upright position.

The numeral 13 designates an annular groove formed in the top of the neck ring to receive the offset tip 12' of the lug 12 when the ring 11 is fitted into an annular recess formed in the top of the neck ring around the central bore thereof in such a manner that the top of such ring 11 lies at the level of the top of the neck ring, as shown in Fig. 2.

In the construction shown in Figs. 5 and 6 wherein the aforesaid sealing ring 11 is applied to the neck of a bottle D preferably between two balls E and F formed thereon, the cap 30, which has a threaded portion 31, has a depending tab 32 which also has a reinforcing bead 34 extending around the circular aperture 35 formed in such tab. In this construction the ring 12 which, when formed of steel, owing to the difference of co-efficient of expansion and contraction thereof, as compared with glass, will fit loosely on the bottle neck to which it has been applied while the neck thereof was in a hot plastic condition and can be oriented to the exact position required to admit of the tab 32 being applied thereover.

In the construction shown in Figs. 7 to 9, a band 40, which is stamped up from a disc of sheet metal, is provided with an integral tab 41 that is folded against the outer face thereof and such offset tubular lug portion 42 which is struck-up therefrom and proferably extends in close proximity to the extreme edge of such tab. Such band is applied to the bottle by fitting the same in a suitable recess provided in the top of the neck ring of a mold in a manner generally similiar to that which the sealing ring 11 is applied to a bottle neck during the manufacture thereof. A screw cap 43 is fitted to a bottle (see Fig. 9) and is provided with a tab 44 that is apertured to receive said tubular lug portion on the rivet 42 of said band and as shown in Fig. 9, when so assembled, the outer end of the rivet 42 is upset by a spinning operation to permanently unite the tab 44 with the tab 41 and consequently with the band 40.

In the construction shown in Fig. 10, the preformed ring 11 is permanently applied to the neck of the jug J and while the neck is in a plastic condition, all in accordance with the method hereinbefore described.

The cap 50, which is of the clamping-lever type, wherein the lower margin is slotted at intervals and the edges of the cap adjacent such slots are crimped around a compression wire member 51 whose ends 52 serve as a fulcrum of a clamping-lever 53 that effects the compression of such wire when the same has been applied to the jug and such lever has been depressed. The lug 12 projects from the jug neck at an angle generally similar to that of the lug 12 shown in Fig. 5, namely about 45° and the upturned tip 12' facilitates the penetration of the same through the bottom loop in the lever 53 as the latter is being depressed to a locking position. When the lever has been thus depressed to substantially the position shown in Fig. 10 with the lug penetrating through said lower loop thereof, the lug itself is then depressed to a substantially vertical position and since said lug is scored transversely across the same, as indicated by the letter $x$, in the manner similar to that in which the lug 12 shown in Fig. 4 is scored, it is impossible to restore the lug to a substantially horizontal position or to elevate the same to a point that will admit of the release of the lever arm without fracturing the lug. Furthermore, the customer of the manufacturer who has purchased the sealed jug from the manufacturer thereof will, upon opening the bottle or jug, fracture the lug and thus himself render the bottle nonreusable, so that in a measure each bona fide customer who buys a bottle or jug equipped with a fracturable lug, co-operates with the manufacturer in preventing the refilling of the same.

In scoring the lugs, such as the lugs 12, and which scoring preferably comprises a V-shaped indentation that is performed on the bottom of the lug, such scoring is sufficient to insure that the lug when once depressed to a position of substantially 90° to the plane of the ring 11, cannot be reversed and returned to the plane of the ring 11 without fracturing and yet such scoring must be insufficient to so weaken the lug that the same will become fractured at being bent to a substantially vertical position during the ordinary handling or shipping of the container.

In order to avoid excessive waste of metal when making the rings 11 with their integral lug 12 projecting therefrom, especially when the same are made of duralumin, bronze or brass, which are relatively expensive as contrasted with steel, it is desirable to stamp out the lug 12 from the inner portion of the disc from which the ring 11 is stamped in the same manner that the tabs 63 are formed, and then, following the removal of the unused balance of the central portion of said disc and prior to scoring the lug so formed, which is integral at its base with the ring at the inner margin of the latter, said lug is folded radially outwardly across the face of the ring. The lug is then scored, preferably on its lower face, and then the outwardly and radially projecting portion thereof is bent to the desired angle, similar to that assumed by the lug 12 in Fig. 5. Although both duralumin and brass melt below the temperature of the plastic glass introduced into the mold, it is possible to employ rings, such as the rings 11, composed of either of these metals, due to the fact that the heat is conducted therefrom into the cooler surfaces of the mold so rapidly that the hot glass cannot melt the rings during the formation of the blank in the blank mold. Moreover, co-efficients of expansion and contraction of these metals and the glass are not incompatible to such an extent that excessive strain is exerted on the finished bottle neck, although such rings will have a tight fit with the finished bottle neck as distinguished from the loose fit of a steel ring when similarly applied.

It is desirable that the lug-carrying or rivet-carrying rings or the separate lugs be hot when introduced into the mold to prevent undue local chilling of the metal thereby. In the case of steel rings or lugs the same are desirably heated to a white heat, as there is no risk of the rings becoming melted during the formation of the blank. In the case of aluminum, brass and the like, the temperature to which these rings are preheated should not be such that, when the heated rings are introduced into the mold and further heated by being subjected to the high temperature of the molten glass, the rings will melt.

Since upon the completion of the formation of the blank in the blank mold of an O'Neill type of bottle making machine, and prior to the removal of the blank, the mold is rotated about a horizontal axis through an arc of 180° to bring the blank into an upright position before the same is removed for delivery to the blow mold, and since in the blow mold a considerable portion of the neck, which has been completely finished in the blank mold, is exposed during the blowing of the body of the bottle, the presence of the metal ring that has been applied to the neck of the bottle in the blank mold, does not in any way interfere with the blowing operation.

The introduction of the rings into the mold can be accomplished manually, at small expense, without slowing up production, even when the same is proceeding at a rate of 30 to 60 bottles per minute. However, these rings may be fed by automatic feed devices at a slightly lower cost and consequently if unusually large quantities of bottles are required, the automatic feeding of the rings is to be preferred.

Various changes in the construction and method of operation herein described may be made without departing from the spirit of my invention as embraced within the scope of the appended claims.

This application is a continuation in part of my co-pending application No. 739,244 filed Aug. 10, 1934 for Nonresealable bottle.

Having thus described my invention, what I claim and desire to obtain by Letters Patent is:

1. In a nonreusable glass bottle having a terminal neck flange, the combination comprising a preformed metal ring which has been permanently applied to the neck of said bottle below the terminal flange thereof during the manufacture of such bottle and while said neck was in a plastic stage, said ring having a lug portion which is adapted to project outwardly from the bottle and said lug being weakened adjacent the base thereof to an extent that it prevents such lug, once it is depressed at right angles to the plane of said ring, from being restored without the fracturing thereof to a position substantially at the level of the plane of said ring.

2. The combination with a glass bottle having a terminal neck flange, of a metal neck band having an integral laterally projecting lug extending outwardly therefrom, said neck band snugly embracing the neck of said bottle below the terminal flange thereof and being formed of a single piece of metal and being so applied to the bottle neck as to be incapable of restoration thereto after being removed therefrom without visible indications of such restoration and said lug having a weakened portion adjacent the base thereof which prevents restoration of the same to a level substantially in the plane of said neck band, once such lug is depressed to a position substantially at right angles to the plane of the neck band, without causing the fracture of such lug.

3. The combination with a glass bottle having a terminal neck flange, of a metal neck band, embracing the neck of said bottle and positioned below said flange, said neck band having an integral, laterally projecting lug extending outwardly therefrom, a cap member sealing the neck of said bottle and interlocked with said lug, said lug having a weakened portion adjacent the base thereof which prevents the removal of said cap when so interlocked with said lug without causing the fracture of such lug.

4. The combination with a glass bottle having a terminal neck flange, of a metal neck band having an integral, laterally projecting lug extending outwardly therefrom, said neck band being formed of a single piece of metal and snugly embracing the neck of said bottle below the terminal flange thereof, a cap member closing the neck of said bottle and having a lever element adapted to lock such cap member on said bottle neck, which lever element extends downwardly from said cap member, and said lug member interlocking with said lever element and being incapable of being released therefrom by the upward movement of such lug without the latter becoming fractured.

5. The combination with a glass bottle having a terminal neck flange, of a metal neck band having an integral laterally projecting lug extending outwardly therefrom, said band snugly embracing the neck of said bottle below said flange, being of substantially less internal diameter than the external diameter of the flange and being so applied to the bottle neck as to be incapable of restoration thereto after being removed therefrom without telltale indications of such restoration.

6. The combination with a glass bottle having a terminal neck flange, of a metal neck band having an integral laterally projecting hollow lug extending outwardly therefrom, said band snugly embracing the neck of said bottle below said flange, being of substantially less internal diameter than the external diameter of the flange and being so applied to the bottle neck as to be incapable of restoration thereto after being removed therefrom without telltale indications of such restoration.

7. In a nonreusable glass bottle having a terminal neck flange, the combination comprising a preformed nonferrous metal ring having a much lower melting point than the glass of which the bottle is composed and which has been permanently applied to the neck of said bottle during the manufacture of such bottle and while said neck was in a plastic stage, said ring having a lug portion which is adapted to project outwardly from the bottle and said lug being weakened adjacent the base thereof to an extent that it prevents such lug, once it is depressed at right angles to the plane of said ring, from being restored without the fracturing thereof to a position substantially at the level of the plane of said ring.

8. In a nonreusable glass bottle having a terminal neck flange, the combination comprising a preformed metal ring the metal element of whose composition consists principally of aluminum which has been permanently applied to the neck of said bottle below the terminal flange thereof during the manufacture of such bottle and while said neck was in a plastic stage, said ring having a lug portion which is adapted to project outwardly from the bottle and said lug being weakened adjacent the base thereof to an extent that it prevents such lug, once it is depressed at right angles to the plane of said ring, from being restored without the fracturing thereof to a position substantially at the level of the plane of said ring.

9. The combination with a glass bottle having an integral terminal neck flange, of an endless metal neck band having an integral, laterally projecting rivet-like lug extending outwardly therefrom, a terminal cap mounted on the bottle neck above said neck flange, said cap having a depending apertured tab element through which said lug projects, the outer end of said lug being upset so as to prevent separation of said tab from said rivet without visible mutilation of one of them and said neck band snugly embracing the neck of said bottle below said flange and being of substantially less internal diameter than the external diameter of the flange and being so applied to the bottle neck during the manufacture of the latter as to be incapable of restoration thereto after being removed therefrom without a telltale indication of such restoration.

10. The combination with a glass bottle having an integral terminal neck flange, of an endless metal neck band, of substantially less internal diameter than the external diameter of said flange, snugly embracing the neck of the bottle below said flange and being applied to the bottle neck during manufacture of the latter as to be incapable of restoration to the bottle neck after removal therefrom, without a telltale indication of such restoration, laterally projecting rivet means carried by said neck band and incapable of restoration thereto after being removed therefrom while such neck band is on the bottle neck without leaving a telltale indication of such restoration, a terminal closure cap mounted on the bottle neck and projecting beyond the outermost limits of the neck flange, said cap having associated depending means which is apertured to receive said rivet means and said rivet means projecting through such depending means and the rivet means being upset in such a manner as to prevent removal of said cap from said bottle and the subsequent recapping of the bottle without leaving a telltale indication of such removal.

11. The combination with a a glass bottle having an integral terminal neck flange, of an endless metal neck band, of substantially less internal diameter than the external diameter of said flange, snugly embracing the neck of the bottle below said flange and being applied to the bottle neck during manufacture of the latter so as to be incapable of restoration to the bottle neck after removal therefrom, without a telltale indication of such restoration, laterally projecting integral, hollow rivet means carried by said neck band incapable of restoration thereto after being removed therefrom while such neck band is on the bottle neck without leaving a telltale indication of such restoration, a terminal closure cap mounted on the bottle neck and projecting beyond the outermost limits of the neck flange, said cap having associated depending means which is apertured to receive said rivet means and said rivet means projecting through such depending means and the rivet means being upset in such a manner as to prevent removal of said cap from said bottle and the subsequent recapping of the bottle without leaving a telltale indication of such removal.

WAITSTILL H. SWENARTON.